United States Patent
Wood

(10) Patent No.: US 6,752,355 B1
(45) Date of Patent: Jun. 22, 2004

(54) METHOD AND SYSTEM FOR EMERGENCY ESCAPE FROM AN AIRCRAFT

(75) Inventor: Jeffrey H. Wood, Eureka, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/367,403

(22) Filed: Feb. 13, 2003

(51) Int. Cl.$^7$ .............................................. B64D 25/08
(52) U.S. Cl. ...................... 244/122 AF; 244/122 AH; 244/122 A
(58) Field of Search .................... 244/121, 122 AF, 244/122 AH, 122 AE, 122 A, 122 R

(56) References Cited

U.S. PATENT DOCUMENTS

| | | | |
|---|---|---|---|
| 451 A | | 11/1837 | Salsbury, Jr. |
| 2,258,724 A | | 10/1941 | Wagner et al. |
| 2,511,168 A | | 6/1950 | Martin et al. |
| 2,699,305 A | * | 1/1955 | Turner et al. ................ 244/141 |
| 2,829,850 A | * | 4/1958 | Culver ....................... 244/141 |
| 2,853,258 A | * | 9/1958 | Polleys ................. 244/122 AH |
| 2,970,793 A | * | 2/1961 | Beem et al. ................. 244/121 |
| 3,618,881 A | | 11/1971 | Fellars et al. |
| 3,670,998 A | * | 6/1972 | Charleville et al. ......... 244/121 |
| 3,729,154 A | * | 4/1973 | Deplante .............. 244/122 AF |
| 4,004,388 A | | 1/1977 | Stefanik |
| 4,301,707 A | * | 11/1981 | Schimmel et al. ........... 89/1.14 |
| 4,570,879 A | * | 2/1986 | Dupin .................. 244/122 AF |
| 4,570,880 A | * | 2/1986 | Gehse .................. 244/122 AF |
| 4,580,745 A | | 4/1986 | Brophy |
| 4,721,272 A | * | 1/1988 | Nordhaus, John P. . 244/122 AF |
| H000451 H | * | 4/1988 | Pinnell ....................... 244/121 |
| 4,982,916 A | * | 1/1991 | Dupont et al. ........ 244/122 AF |
| 5,072,896 A | * | 12/1991 | McIntyre et al. ..... 244/122 AF |
| 5,085,383 A | | 2/1992 | Larkin et al. |
| 5,104,067 A | * | 4/1992 | McIntyre et al. ..... 244/122 AF |
| 5,289,996 A | * | 3/1994 | Speelman, III ....... 244/122 AF |
| 5,301,904 A | * | 4/1994 | Guill ...................... 244/129.1 |

* cited by examiner

Primary Examiner—Charles T. Jordan
Assistant Examiner—T. Nguyen
(74) Attorney, Agent, or Firm—Black Lowe & Graham PLLC

(57) ABSTRACT

A method and system for ejection operation in an aircraft are provided. The system allows selection of one of two modes of ejection: ejecting through the canopy; and jettisoning the canopy before ejection. The system includes an ejection mode selector for selecting one of a canopy shattering ejection mode and a canopy jettison ejection mode, canopy shattering components, canopy jettison components, and an ejection actuator. The ejection actuator activates one of the canopy shattering components or the canopy jettison components based on the selected ejection mode.

21 Claims, 6 Drawing Sheets

METHOD AND SYSTEM FOR EMERGENCY ESCAPE FROM AN AIRCRAFT

RELATED APPLICATIONS

This invention relates to copending U.S. patent application Ser. No. 10/366,949, filed Feb. 13, 2003, U.S. patent application 10/367,024, filed Feb. 13, 2003, U.S. patent application 10/367,064, filed Feb. 13, 2003, U.S. patent application 10/367,404, filed Feb. 13, 2003, and U.S. patent application 10/367,062, filed Feb. 13, 2003, all of which are hereby incorporated by reference.

GOVERNMENT LICENSE RIGHTS

This invention was made with Government support under U.S. Government contract F33615-97-2-3407 awarded by the U.S. Air Force. The Government has certain rights in this invention.

FIELD OF THE INVENTION

This present invention relates to aircraft seats and, more specifically, to aircraft ejection seats.

BACKGROUND OF THE INVENTION

At the U.S. Military's request, common-design aircraft are being developed for the U.S. Navy, the U.S. Marine Corps, and the U.S. Air Force. The Navy, Marine Corps, and Air Force further modify the common-design aircraft.

One example of further modification of the common design is an ejection system for emergency escape from an aircraft. The Navy and Marine Corps traditionally favor ejecting from an aircraft as quickly as possible because of the hazards of carrier operations. The quickest ejection method is ejecting through the canopy. The U.S. Air Force prefers jettisoning the canopy prior to seat ejection. Because of these desires for two different ejection methods, two separate canopy systems are manufactured. This greatly increases costs over a common design aircraft that has not been modified.

Also, once a canopy system is installed in an aircraft, the ejection method is set. The customer can not easily alter the aircraft to allow for a different ejection method.

Therefore, there exists an unmet need to allow a customer to select and operate an ejection system in its preferred format without incurring great production or alteration costs.

SUMMARY OF THE INVENTION

The present invention provides a method and system for ejection operation in an aircraft. The present invention allows selection of one of two modes of ejection: ejecting through the canopy; and jettisoning the canopy before ejection.

The present invention provides a method and system for ejection operation in an aircraft. The system allows selection of one of two modes of ejection: ejecting through the canopy; and jettisoning the canopy before ejection. The system includes an ejection mode selector for selecting one of a canopy shattering ejection mode and a canopy jettison ejection mode, canopy shattering components, canopy jettison components, and an ejection actuator. The ejection actuator activates one of the canopy shattering components or the canopy jettison components based on the selected ejection mode.

In one aspect of the invention, the canopy shattering components include an explosive device within the canopy or a piercing device attached to an ejection seat.

In another aspect of the invention, the canopy jettison components include one or more force generating devices, such as explosive devices, located between the canopy and the aircraft.

In still another aspect of the invention, the ejection mode selector is located within a cockpit of the aircraft.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides a method and system for ejection operation in an aircraft. The present invention allows selection of one of two modes of ejection: ejecting through the canopy; and jettisoning the canopy before ejection.

Figure 1:
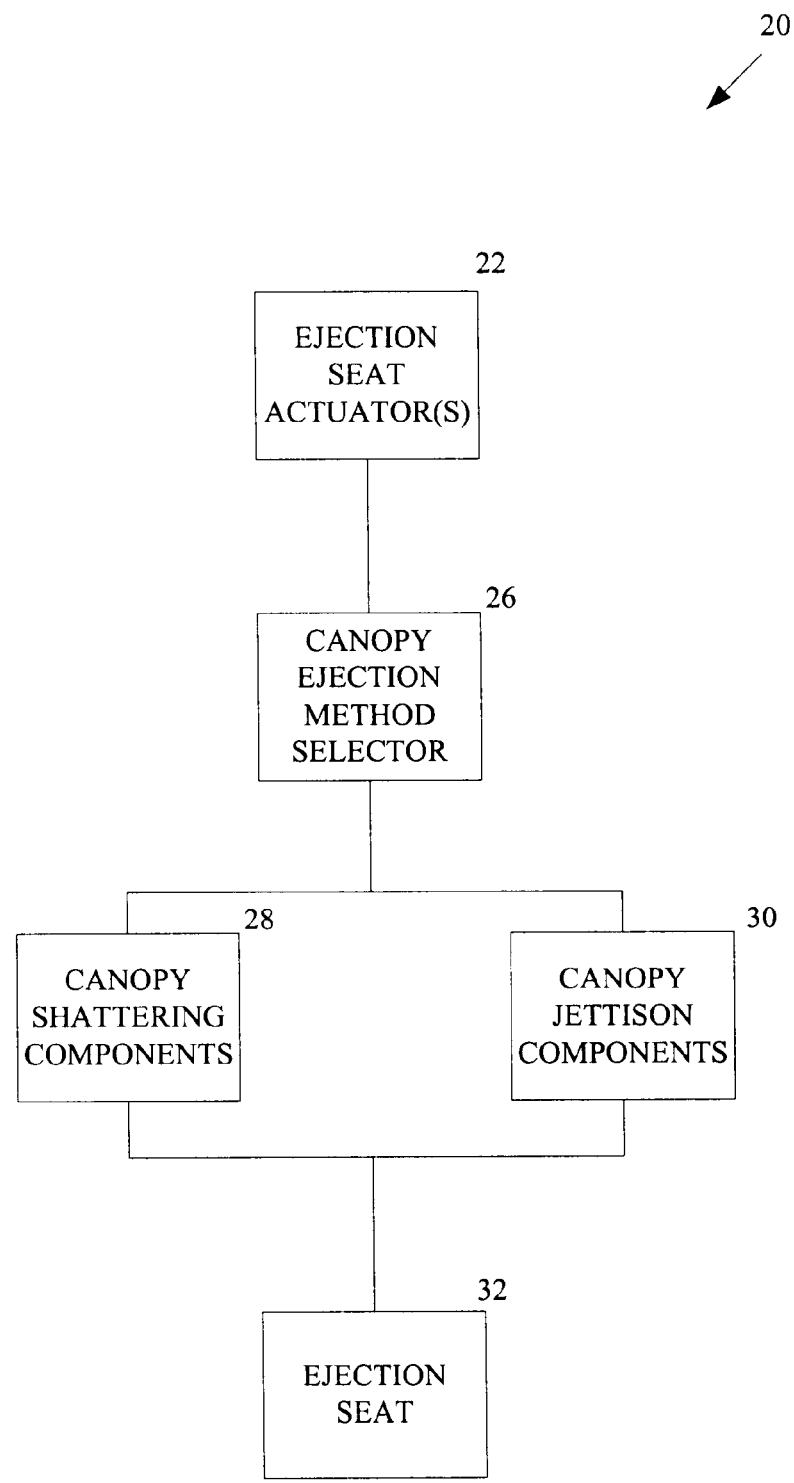
FIG. 1 is a block diagram of the present invention.

FIG. 1 shows a block diagram of a non-limiting example of a dual mode ejection system 20. The ejection system 20 includes one or more ejection seat actuators 22, a canopy ejection method selector 26, canopy shattering components 28, canopy jettison components 30, and an ejection seat 32. The ejection seat actuators 22 are connected to the ejection method selector 26. The canopy ejection method selector 26 is connected to the canopy shattering components 28 and the canopy jettison components 30. The canopy ejection method selector 26 is suitably a toggle switch arranged for sending signals generated by the ejection seat actuators 22 to the canopy shattering components 28 or the canopy jettison components 30 based on the ejection method chosen by the canopy ejection method selector 26.

A non-limiting example of the ejection seat actuators 22 are ejection handles located above and below the ejection seat 32. The canopy shattering components 28 suitably include a mechanism for shattering the canopy, thereby allowing the ejection seat 32 to pass through the now-shattered canopy without causing harm to the occupant of the ejection seat 32. Non-limiting examples of canopy shattering mechanisms include explosive devices, such as a detonation cord, on the canopy or a puncturing device on the ejection seat 32.

The canopy jettison components 30 suitably include force generating devices, such as without limitation explosive charges or mechanical actuators, for forcing the canopy and supporting structures of the canopy into a wind stream 60.

Figure 2A:
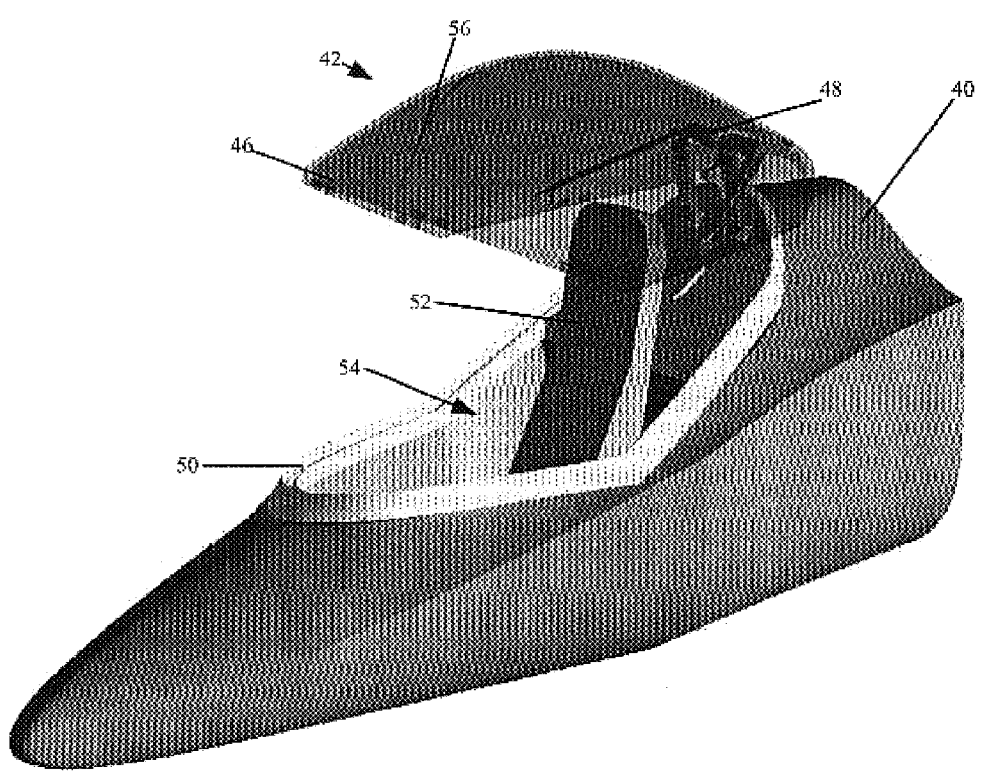
FIG. 2A illustrates perspective view of a cockpit portion of an aircraft including a canopy.

FIGS. 2A and B illustrate a non-limiting example of a cockpit 54 of an aircraft 40 that includes a canopy system 42 and an ejection seat 52. In one embodiment, the canopy system 42 includes a frameless canopy 46, such as without limitation a polycarbonate or acrylic frameless canopy, that is opened and closed during normal operation by a canopy hinge device 48 coupled to an aft end of the canopy 46 and the cockpit 54. It can be appreciated that framed canopies can also be used. When the canopy hinge device 48 is in the open position, the canopy 46 is angled away from the ejection seat 52 for allowing normal ingress and egress by a pilot. When the hinge device 48 is in the closed position, the canopy 46 securely mates with a canopy rail 50 that surrounds the cockpit 54. It can be appreciated that the canopy 46 includes a base rim that connects to the rail 50, such as the examples shown in copending U.S. patent application Ser. No. 10/302,539, filed Nov. 22, 2002 and U.S. patent application No. 10/366,949, U.S. patent application No. 10/367,024, U.S. patent application 10/367,064, U.S. patent application No. 10/367,404, and U.S. patent application No. 10/367,062, all filed Feb. 13, 2003. The contents of all of the above co-pending patent applications are hereby incorporated by reference.

Figure 2B:
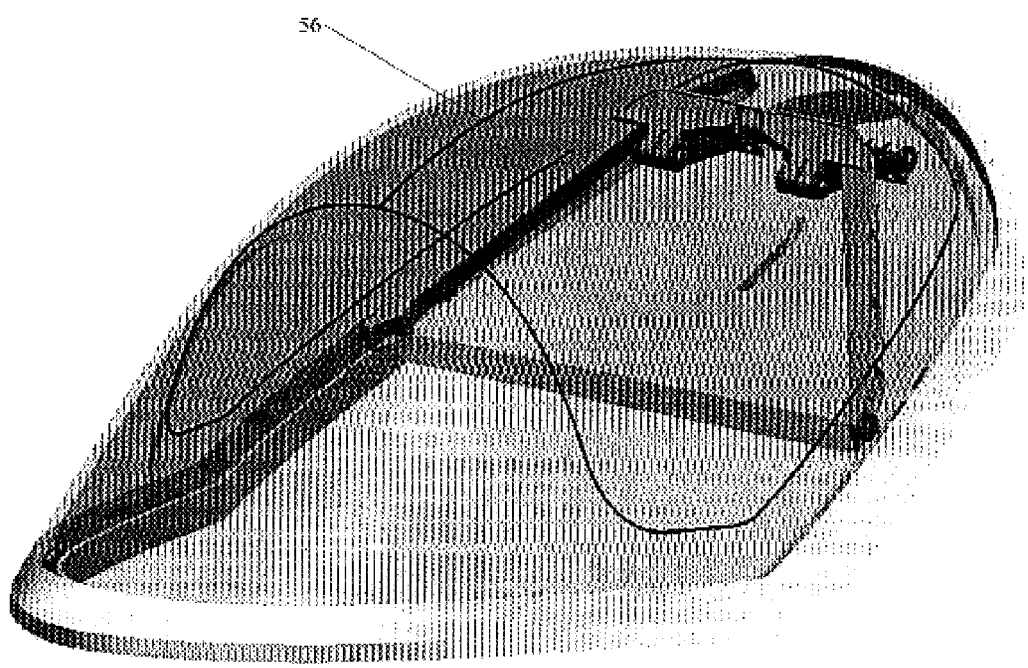
FIG. 2B illustrates perspective view of a canopy with a detonation cord.
Figure 3:
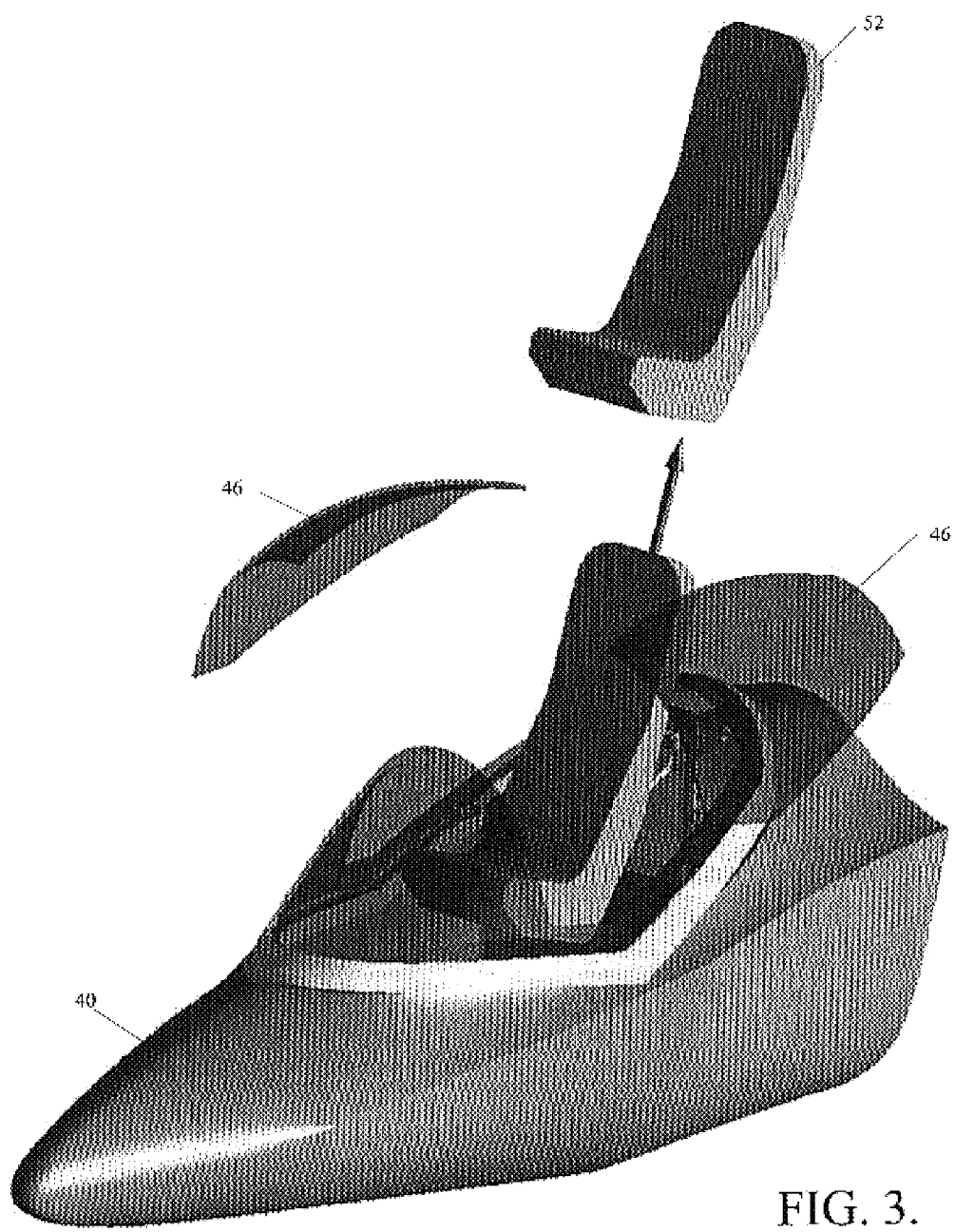
FIG. 3 illustrates a first method of ejection from the aircraft shown in FIG. 2.

The canopy shattering components 28 include, in one non-limiting example, a detonation cord 56 that is attached to the canopy 46. Referring now to FIGS. 2A, 2B, and 3, the detonation cord 56 shatters the canopy 46 just prior to actuation of the ejection seat 52 when the canopy ejection method selector 26 is in the ejecting through the canopy mode and an ejection seat actuator 22 has been activated. In another embodiment, the ejection seat 52 includes canopy shattering components (not shown), such as a rail that extends above the ejection seat 52. The rail penetrates the canopy, thus destroying the canopy 46 after ejection seat 52 initiation.

Figure 4A:
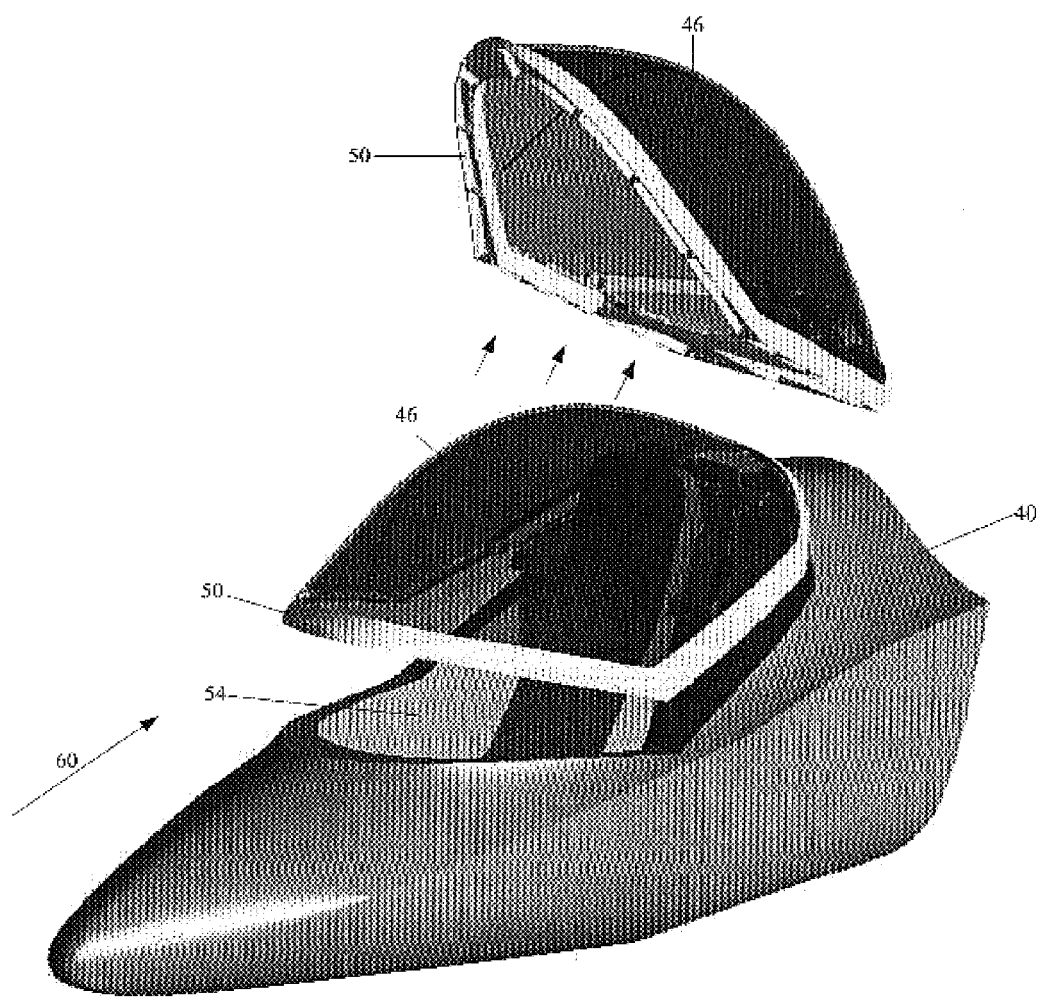
FIGS. 4A and 4B illustrate a second method of ejecting from the aircraft illustrated in FIG. 2.
Figure 4B:
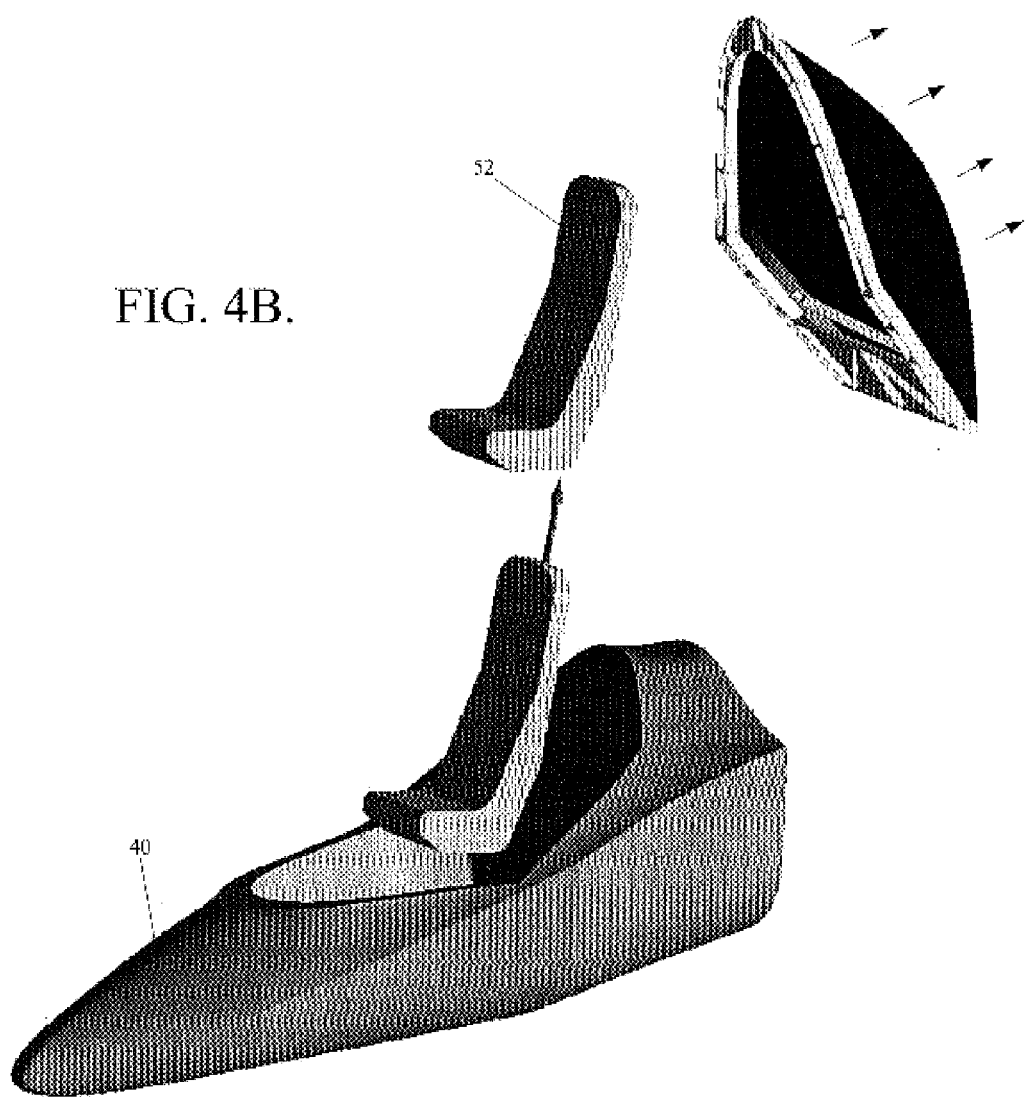

FIGS. 4A and 4B illustrate a canopy jettison system for canopy removal prior to ejection and its method of operation. Explosive devices or mechanical force devices (not shown) are located between the rail 50 and the aircraft 40. When activated, the explosive devices or mechanical force devices force the canopy rail 50 to separate from the aircraft 40. The canopy 46 remains connected to the rail 50. Also, mechanical or explosive devices (not shown) cause separation of the hinge device 48 from the cockpit 54. The explosive or mechanical force devices suitably produce more force on the canopy rail 50 at the forward end of the canopy 46 in order to force the canopy rail 50 and canopy 46 into an air stream flowing past the aircraft 40 as the aircraft 40 flies through the air. The air stream forces the canopy 46 aft and away from the cockpit 54, thereby allowing safe travel of the ejection seat 52 forward of the now separated canopy 46 (see FIG. 4B).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for ejection from an aircraft, the system comprising:
   an ejection mode selector for selecting one of a canopy shattering ejection mode or a canopy jettison ejection mode;
   canopy shattering components;
   canopy jettison components; and
   an ejection actuator for activating one of the canopy shattering components or the canopy jettison components based on the selected ejection mode.

2. The system of claim 1, wherein the canopy shattering components include an explosive device within the canopy.

3. The system of claim 1, wherein the canopy is an injection-molded frameless canopy.

4. The system of claim 3, wherein the canopy is at least one of a polycarbonate or acrylic canopy.

5. The system of claim 1, wherein the canopy jettison components include one or more force generating devices located between the canopy and the aircraft.

6. The system of claim 5, wherein the force generating devices include explosive devices.

7. The system of claim 1, further comprising an ejection seat coupled to the ejection actuator, wherein the canopy shattering components include a piercing device attached to the ejection seat.

8. The system of claim 1, wherein the ejection actuator includes one or more ejection handles attached to the ejection seat.

9. The system of claim 1, wherein the ejection mode selector is located within a cockpit of the aircraft.

10. An aircraft cockpit, the cockpit comprising:
    a canopy; and
    an ejection seat including:
       an ejection mode selector for selecting one of a canopy shattering ejection mode or a canopy jettison ejection mode;
       canopy shattering components;
       canopy jettison components; and
       an ejection actuator for activating one of the canopy shattering components or the canopy jettison components based on the selected ejection mode.

11. The cockpit of claim 10, wherein the canopy shattering components include a component for explosively destroying the canopy.

12. The cockpit of claim 10, wherein the canopy is an injection-molded frameless canopy.

13. The cockpit of claim 2, wherein the canopy is at least one of a polycarbonate or acrylic canopy.

14. The cockpit of claim 10, wherein the canopy jettison components include one or more force generating devices located between the canopy and the aircraft.

15. The cockpit of claim 14, wherein the force generating devices include explosive devices.

16. The cockpit of claim 10, further comprising a seat coupled to the ejection actuator, wherein the canopy shattering components include a piercing device attached to the seat.

17. The cockpit of claim 10, wherein the ejection actuator includes one or more ejection handles attached to the seat.

18. The cockpit of claim 10, wherein the ejection mode selector is located within a cockpit of the aircraft.

19. A method for ejecting from an aircraft, the method comprising:
    selecting one of a canopy shattering mode or a canopy jettison mode of ejection;
    performing canopy removal based on the selected mode;
    shattering the canopy and ejecting through the shattered canopy when the canopy shattering mode is selected; and
    jettisoning the canopy and ejecting through space previously occupied by the jettisoned canopy when the canopy jettison mode is selected.

20. The method of claim 19, wherein performing includes shattering the canopy before initiation of an ejection seat if the canopy shattering mode is selected.

21. The method of claim 19, wherein performing includes jettisoning the canopy before initiation of an ejection seat if the canopy jettison mode is selected.

* * * * *